United States Patent
Ciampolini et al.

(10) Patent No.: US 10,272,795 B2
(45) Date of Patent: Apr. 30, 2019

(54) ELECTRONIC CONTROL DEVICE FOR CONTROLLING A VEHICLE BATTERY PACK AND SYSTEM EMPLOYING SUCH A DEVICE

(71) Applicant: MAGNETI MARELLI S.P.A., Corbetta (IT)

(72) Inventors: Franco Ciampolini, Bologna (IT); Danilo Pritelli, Bologna (IT); Rosanna Suglia, Bologna (IT); Gianluca Aurilio, Capua (IT)

(73) Assignee: Magneti Marelli S.p.A., Corbetta (IT)

( * ) Notice: Subject to any disclaimer, the term of this patent is extended or adjusted under 35 U.S.C. 154(b) by 53 days.

(21) Appl. No.: 15/202,987

(22) Filed: Jul. 6, 2016

(65) Prior Publication Data

US 2017/0008418 A1 Jan. 12, 2017

(30) Foreign Application Priority Data

Jul. 9, 2015 (IT) .................. 102015000032349

(51) Int. Cl.
*B60L 9/00* (2019.01)
*B60L 11/00* (2006.01)
(Continued)

(52) U.S. Cl.
CPC ............. *B60L 11/1864* (2013.01); *B60L 3/12* (2013.01); *B60L 11/1861* (2013.01);
(Continued)

(58) Field of Classification Search
CPC ............. B60L 11/1864; B60L 11/1866; B60L 2240/545; B60L 2240/547; B60L 2240/549; B60L 3/12; H02J 7/00; Y02T 90/16
(Continued)

(56) References Cited

U.S. PATENT DOCUMENTS 6,184,656 B1 2/2001 Karunasiri et al.
9,840,156 B2 * 12/2017 DeBoer, III ........ B60L 11/1844
(Continued)

FOREIGN PATENT DOCUMENTS

| EP | 1042138 A1 | 10/2000 |
| WO | 9932323 | 7/1999 |
| WO | 2014155716 A1 | 10/2014 |

OTHER PUBLICATIONS

Search Report issued by the Italian Patent Office for Italian Patent Application No. ITUB20152010 dated Mar. 9, 2016.

*Primary Examiner* — Harry Y Oh
(74) *Attorney, Agent, or Firm* — Howard & Howard Attorneys PLLC

(57) ABSTRACT

An electronic control device for controlling a vehicle battery pack comprises a non-programmable monitoring and actuation unit and a two-way serial communication interface. The non-programmable monitoring and actuation unit is electrically and operatively connectable to the battery pack and to each of the battery cells C to detect analog battery parameters P, including at least the magnitudes of battery voltage Vb and battery current Ib, in addition to temperature (Tc1, Tcn), current (Ic1, Icn) and voltage (Vc1, Vcn) of each battery cell C. The non-programmable monitoring and actuation unit generates monitoring signals Sm representative of the detected analog battery parameters P. The two-way serial communication interface is connected to the non-programmable monitoring and actuation unit to receive the monitoring signals Sm and to supply the aforesaid at least one command signal Sc.

18 Claims, 2 Drawing Sheets

(51) Int. Cl.
*G05D 1/00* (2006.01)
*G05D 3/00* (2006.01)
*G06F 7/00* (2006.01)
*G06F 17/00* (2019.01)
*B60L 11/18* (2006.01)
*B60L 3/12* (2006.01)
*H02J 7/00* (2006.01)

(52) U.S. Cl.
CPC ............ B60L 11/1866 (2013.01); H02J 7/00 (2013.01); *B60L 2240/545* (2013.01); *B60L 2240/547* (2013.01); *B60L 2240/549* (2013.01); *B60L 2270/40* (2013.01); *Y02T 10/7005* (2013.01); *Y02T 10/7061* (2013.01); *Y02T 90/16* (2013.01)

(58) Field of Classification Search
USPC .......................................................... 701/22
See application file for complete search history.

(56) References Cited

U.S. PATENT DOCUMENTS

| | | | |
|---|---|---|---|
| 2008/0061764 A1* | 3/2008 | Tae | B60L 3/0038 324/72 |
| 2010/0156352 A1* | 6/2010 | Muta | B60K 6/28 320/134 |
| 2012/0161677 A1* | 6/2012 | Kunimitsu | H01M 2/1077 318/139 |
| 2012/0286706 A1* | 11/2012 | Ohkura | B60L 3/0007 318/139 |
| 2012/0316813 A1 | 12/2012 | Langheim | |
| 2013/0026994 A1* | 1/2013 | Morikawa | G01R 31/3658 320/134 |
| 2013/0057291 A1* | 3/2013 | Takahashi | G01R 31/3662 324/427 |
| 2014/0062408 A1 | 3/2014 | Sekino et al. | |
| 2016/0009182 A1 | 1/2016 | Nakanishi et al. | |
| 2017/0043674 A1* | 2/2017 | DeBoer, III | B60L 11/1825 |

* cited by examiner

ELECTRONIC CONTROL DEVICE FOR CONTROLLING A VEHICLE BATTERY PACK AND SYSTEM EMPLOYING SUCH A DEVICE

CROSS-REFERENCE TO RELATED APPLICATIONS

The present application claims priority to and all the benefits of Italian Patent Application No. 102015000032349, filed on Jul. 9, 2015, which is hereby expressly incorporated herein by reference in its entirety.

BACKGROUND OF THE INVENTION

1. Field of the Invention

The present invention relates to the technical field of electronic control devices.

In particular, the invention relates to an electronic control device for controlling a vehicle battery pack and to a control system employing such a device.

Furthermore, the invention relates to a battery pack control system, employing the aforesaid control device, and to a respective apparatus for supplying electrical energy to a motion system of an electrically-driven or hybrid vehicle.

2. Description of the Related Art

In the automotive field, particularly in the context of motion systems and batteries for electrically-driven or hybrid vehicles, the battery pack which supplies the electrical propulsion unit is particularly important because it is often the most costly element of the electro-mechanical components which form the hybrid/electrical system and moreover is the most delicate component and the one most subject to deterioration over time. Typically, in the considered application context, the battery pack comprises a battery formed by electrochemical lithium batteries arranged in series and/or in parallel in order to achieve the desired capacity and voltage. With regards to voltage, the battery pack is defined in "class A" if the battery can supply a nominal voltage lower than 60 V, and in "class B" if it can supply a nominal voltage higher than 60 Volt and up to 1.5 kiloVolt.

Furthermore, the battery pack typically includes an air or liquid cooling system, cut-off elements (e.g., relays to connect or disconnect the battery pack from the load), safety circuits, pre-charging circuits and analog circuits for managing the cells.

From the above, it is apparent that the battery pack control is particularly important. Such a control comprises monitoring numerous analogue operating parameters (e.g., voltages, currents, temperatures of the various cells and of the entire battery), controlling various operative actions on the battery pack (e.g., opening/closure of relays, activation/deactivation of safety and/or pre-charging procedures, control of cooling mechanisms) and managing the active elements (i.e., the electrochemical cells) which is necessary to guarantee the required performance and reliability.

For this reason, the battery packs commonly used in this context include sophisticated control systems (usually named "Battery Management System"—BMS) integrated in the battery pack itself.

The core of a BMS control system is a processing unit made by means of one or more electronic microprocessors, which has the purpose of collecting all the monitoring data from the battery, of deciding and implementing the actions to be performed on the battery pack and of connecting the BMS to other systems and/or control units of the vehicle.

In particular, the processing unit of the BMS is in charge of connecting or disconnecting the battery pack from the vehicle system, of implementing the respective pre-charging and discharging operations, of managing the cooling system to maintain the cells in an optimal temperature range for their operation, of checking the electrical safety state of the battery pack (which implies the measurement of parameters such as temperature and humidity of the air contained in the battery pack, the insulation resistance value, the state of the protection and cut-off members, the closure and correct connection of the battery pack with the electric devices present on the vehicle), of notifying the other vehicle control units about malfunctions or faults found and of adopting the respective securing actions, if envisaged.

Additionally, the BMS may comprise a set of additional specific control elements for the battery cells (usually named CSC "Cell Supervisory Controller") configured to monitor physical and electrical parameters of a respective cell, checking that they are within a given permitted range. Typically, each control element acts only on the battery cell connected to it and operates both passively and actively, by sending measured data and parameters to the microprocessor of the BMS, which processes them in order to know the charge and integrity state of all the cells, to manage and protect the cells of the battery pack, and further to perform equalization and balancing operations of the cells to one another, either by discharging or also by charging the cells which are not perfectly balanced.

The processing unit with microprocessor of the BMS is thus the essential component of the entire battery pack control system and so is always integrated in the battery pack itself.

The known solutions illustrated above have rather high costs and complexity. This is due to two main aspects: a first aspect related to the cost and complexity of the processing unit with microprocessor; a second aspect related to the number, cost and complexity of the control elements and of the respective wirings towards the single cells which form the battery.

For class B battery packs, which may comprise a number of cells of the order of hundreds and even more, the aforesaid second aspect is predominating.

For class A battery packs, which typically comprise a few tens of cells at most, the first aforesaid aspect is predominating instead.

The need to reduce costs and complexity of the battery pack, without damaging or reducing its functionalities and the performance, is thus particularly felt.

With reference to the control elements, some solutions, recently emerged, envisage control elements capable of supervising multiple cells; each element is arranged near the cells to be supervised and is connected thereto by means of a simplified wiring. Such solutions make it possible to at least partially solve the drawbacks related to costs and complexity of the control elements, but are developed for class B battery packs; the needs for further improvements concerning this aspect particularly for class A batteries remain unsolved.

Furthermore, with reference to the cost and complexity of the processing unit with microprocessor, there are no solutions to date capable of completely satisfying the needs of simplification and cost reduction. Indeed, it is worth noting that there are, in addition to the cost of the microprocessor, the costs related to the control logics which must be consequently present in the BMS (EEPROM, driving circuits of the CAN buses, driving circuits of the command actuators, communication interfaces with other control units of the vehicle and so on), and also the costs of the firmware and software (operating system, BIOS, diagnostic system and so on) integrated in such a system.

The available solutions of the prior art, mentioned above, cannot currently satisfy the desired requirements of simplification and cost reduction of a battery pack control system and moreover are affected by the above cited drawbacks.

In light of the above, mainly in the scope of automotive applications, and in particular in the context of battery packs for electrical or hybrid vehicles, the need is strongly felt to have control electronic devices and systems of the battery pack which are less complex and costly than the current systems and which, at the same time, guarantee equal performance, functionality and reliability.

SUMMARY OF THE INVENTION

It is the object of the present invention to provide an electronic control device for controlling a vehicle battery pack, the device being capable of monitoring a large plurality of battery parameters and of actuating the main operating functions of the battery pack in controlled manner, having at the same time a simplified structure and a consequence cost reduction, so as to make it possible to at least partially avoid the drawbacks illustrated above with reference to the prior art, and of responding to the aforesaid needs which are particularly felt in the considered technical sector.

Such an object is achieved by an electronic control device for controlling a vehicle battery pack where the battery pack provides a battery voltage (Vb) and a battery current (Ib) through a plurality of battery cells (C), and wherein the device is adapted to interact with a remote control unit external to the battery pack. The device includes a non-programmable monitoring and actuation unit, electrically and operatively connectable to the battery pack and to each of the battery cells (C) to detect analogue battery parameters (P), comprising at least the magnitudes of battery voltage (Vb) and battery current (Ib). The non-programmable monitoring and actuation unit generates monitoring signals (Sm) representative of the detected analogue battery parameters (P), to receive at least one command signal (Sc) representative of at least one respective operation command (CM) of the battery pack, and activates said at least one command (CM). A two-way serial communication interface is connected to the non-programmable monitoring and actuation unit to receive the monitoring signals (Sm) and to provide the at least one command signal (Sc), and connectable to an external two-way serial communication line (LS) to send the monitoring signals (Sm) to the remote control unit, to be processed by the remote control unit, and to receive the at least one command signal (Sc) from the remote control unit, through said two-way serial communication line (LS).

It is a further object of the present invention to provide a control method and an entire electronic control system employing the aforesaid device and having similar advantages.

It is also an object of the present invention to provide an apparatus for supplying electrical energy for a motion system of an electrically-driven or hybrid vehicle comprising the aforesaid control system.

To this end, a control system for controlling a vehicle battery pack according to the invention includes an electronic control device and a remote control unit, arranged externally with respect to the battery pack to be controlled, so as to receive and process monitoring signals (Sm) that are sent by the electronic control device, and generates and sends to the electronic control device at least one command signal (Sc). A two-way serial communication line (LS) connects and puts in communication the control device and the remote control unit.

An apparatus for supplying electrical energy to a system for moving an electrically-driven or hybrid vehicle according to the invention includes a battery pack adapted to provide a battery voltage (Vb) and a battery current (Ib) through a plurality of battery cells (C); a control system for controlling a battery pack.

A method for controlling a vehicle battery pack, adapted to provide a battery voltage (Vb) and a battery current (Ib) through a plurality of battery cells (C) according to the invention includes the steps of: detecting analogue battery parameters (P), through a non-programmable monitoring and actuation unit, electrically and operatively connectable to the battery pack and to each of the battery cells (C). The analogue battery parameters (P) include at least the magnitudes of battery voltage (Vb) and battery current (Ib). The method further includes the step of generating monitoring signals (Sm) representative of the analogue parameters (P) detected, and sending, by a control device comprising the non-programmable monitoring and actuation unit, the generated monitoring signals (Sm) to a remote control unit, arranged externally with respect to the battery pack, through a two-way serial communication line (LS). The method also includes the step of processing the monitoring signals (Sm) by the remote control unit; generating, by said remote control unit, at least one command signal (Sc) representative of at least one respective battery pack operation command (CM). The control device, through the two-way serial communication line (LS), receives at least one control signal (Sc), generated by the remote control unit. The method further includes the step of activating said at least one command (CM), by the non-programmable monitoring and actuation unit, based on the at least one command signal (Sc) received.

BRIEF DESCRIPTION OF THE DRAWINGS

Other advantages of the invention will be readily appreciated as the same becomes better understood by reference to the following detailed description when considered in connection with the accompanying drawings, wherein.

It is worth noting that equal or similar elements in the aforesaid figures will be indicated with the same numeric or alphanumeric references.

DETAILED DESCRIPTION OF THE INVENTION

Figure 1:
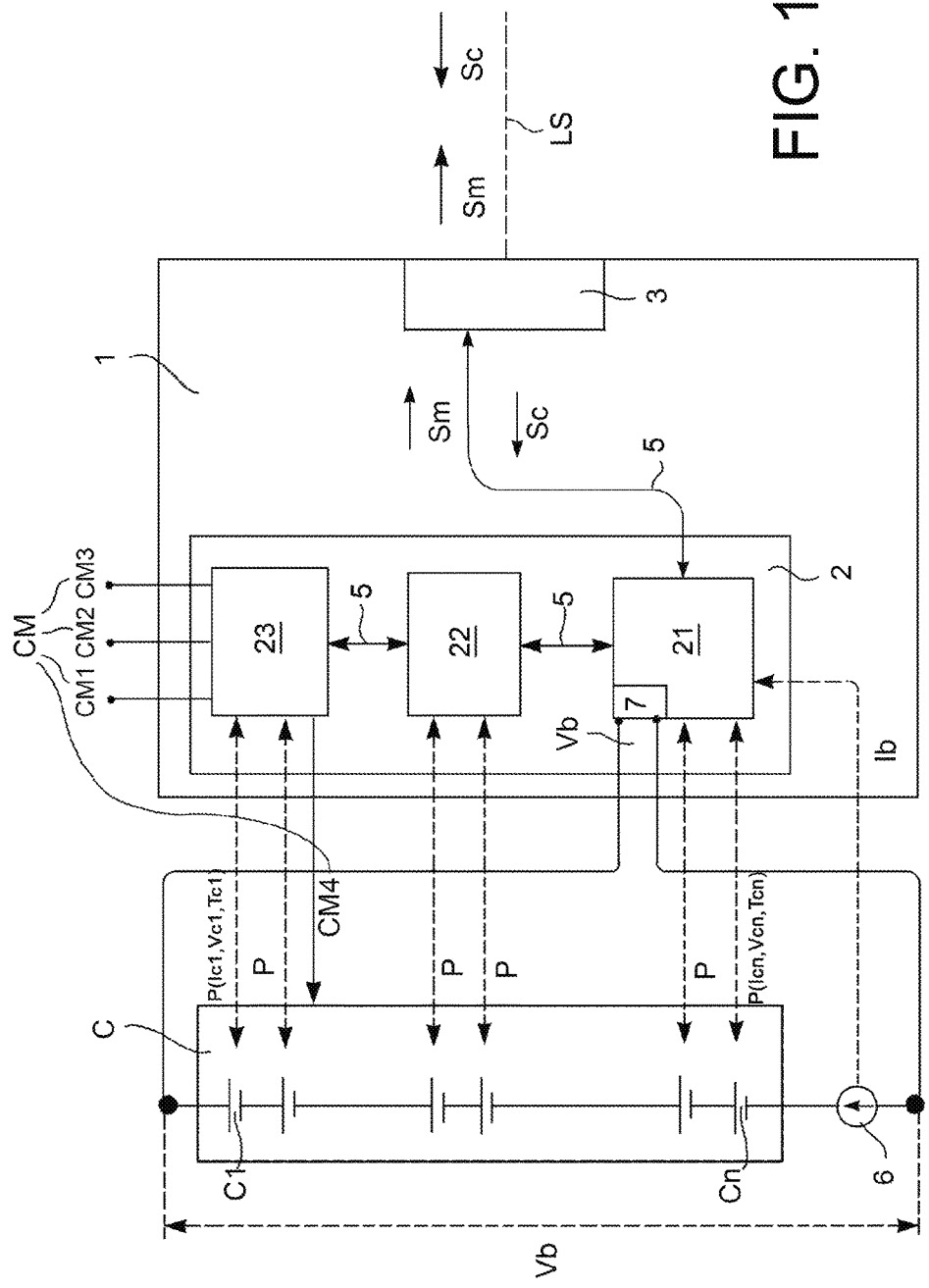
FIG. 1 schematically illustrates an embodiment of a control device according to the present invention.

An electronic control device 1 for controlling a battery pack 50 for a vehicle is described with reference to FIGS. 1 and 2.

The device 1 may be used, for example, in a battery pack 50 adapted to supply a battery voltage Vb and a battery current Ib through a plurality of battery cells C. The device 1 is adapted to interact with a remote control unit 60 external to the battery pack 50.

The device 1 comprises a non-programmable monitoring and actuation unit 2 and a two-way serial communication interface 3.

The non-programmable monitoring and actuation unit 2 is electrically and operatively connectable to the battery pack 50 and to each of the battery cells C to detect analogue battery parameters P, comprising at least the magnitudes of battery voltage Vb and battery current Ib.

The non-programmable monitoring and actuation unit 2 generates monitoring signals Sm representative of the detected analogue battery parameters P, to receive at least one command signal Sc representative of at least one respective operation command CM of the battery pack 50, and to activate said at least one command.

The two-way serial communication interface 3 is connected to the non-programmable monitoring and actuation unit 2 to receive the aforesaid monitoring signals Sm and to supply the aforesaid at least one command signal Sc.

The two-way serial communication interface 3 is further connectable to an external two-way serial communication line LS to send the monitoring signals Sm to the remote control unit 60, for them to be processed by the remote control unit 60, and to receive the at least one command signal Sc from the remote control unit 60, through the aforesaid two-way serial communication line LS.

It is worth noting that the aforesaid monitoring and actuation unit 2 is defined "non-programmable" because it is adapted to operate without storing and/or without executing one or more control and/or processing programs.

So, in addition to being non-programmable, such a monitoring unit 2 can also be defined "non-programmed", and in particular it does not contain a memory for software programs.

According to an embodiment option, the non-programmable monitoring and actuation unit 2 does not include a microprocessor nor a microcontroller nor a processor of any other type.

In a particular implementation example, the non-programmable monitoring and actuation unit 2 comprises: analogue electronic circuits, known in themselves, and adapted to detect the aforesaid analogue parameters of the battery cells and of the entire battery; electronic circuits adapted to digitalize the analogue parameters, in order to obtain the aforesaid monitoring signals Sm; electronic interface circuits towards a communication line to transmit the monitoring signals Sm and to receive the one or more control signals Sc; actuation circuits to drive and/or control actuators, present in the battery pack, adapted to implement the procedures provided for the operation of the battery pack (which will be specified in greater detail below).

In the implementation example shown above, the monitoring signals Sm are simply digitalization of the measured analogue parameters, with no need for further processing, and with no need for generating further information messages. Furthermore, each of the one or more control signals Sc is simply a digitalized driving and/or activation signal of a respective operative function, and does not require a processing to determine the commands that the control device 1 must perform.

According to an embodiment option, the aforesaid analogue battery parameters P further comprise temperature Tc1, Tcn, and/or current Ic1, Icn and/or voltage Vc1, Vcn of each battery cell C.

In a further realization example, the monitoring signals Sm further comprise diagnostic signals of the detection sensors and/or of the actuators of the commands and signals indicative of the correct operation of such sensors and/or actuators.

However, it is worth noting that the non-programmable monitoring and actuation unit 2, in the embodiments described above, despite its low complexity and not having logic processing, ensures functions suited to the desired requirements: indeed, such a non-programmable control unit 2 performs an extensive monitoring of all the analogue parameters (electronic and physical) detected by the battery and of each battery cell, makes available information related to each of such parameters, and can activate the main procedures envisaged for correct operation of the battery pack.

According to an embodiment, the device 1 further comprises a supply input connectable to the battery pack 50, so that the device 1 is supplied by the battery pack 50 and is electrically insulated with respect to the remote control unit 60. Such an embodiment advantageously makes it possible to simplify the hardware elements needed to supply the electricity with respect to solutions of the prior art, in which the control system of the battery pack is supplied by the common vehicle battery (and not by the battery associated to the electric propulsion) and thus requires electric insulation elements.

According to an embodiment of the device 1, the non-programmable monitoring and actuation unit 2 comprises a plurality of supervision modules 21, 22, 23, wherein each of the supervision modules 21, 22, 23 detects temperature, current and voltage of a respective battery cell or of each cell of a respective sub-set of battery cells, and generates the respective monitoring signals Sm.

Furthermore, in such a case, the device 1 further comprises an internal two-way communication line 5, connected to each of the supervision modules 21, 22, 23 and also connected to the two-way serial communication interface 3. Such an internal two-way communication line 5 collects and transmits the analogue parameters detected by the supervision modules 21, 22, 23 to the two-way serial communication interface 3, and transmits the at least one command signal Sc to at least one of the supervision modules 21, 22, 23.

It is worth noting that the "modular" structure described above allows many implementation variants, by choosing a "one-to-one" correspondence or one of the possible "one-to-many" correspondences between supervision module and battery cell.

In particular, in an implementation option, the supervision module, one for each single cell or one for multiple cells, checks that during the operation of the battery pack the voltage at the terminals of the cell is always maintained within a given safety range, in order to safeguard its reliability and functionality over time: for example, the supervision module checks that the voltage does not increase or decrease under respective predetermined minimum and maximum voltage thresholds. For the correct management of the battery pack and to safeguard its reliability, the supervision module further detects the temperature of the supervised electrochemical cells: indeed, excessively low or excessively high temperatures may compromise the correct and safe operation and reliability of the cells over time. The supervision module also detects the current and/or the charge present in the cells.

According to a realization option of the device 1, each of the supervision modules 21, 22, 23 also equalizes the electrical charge between the different battery cells C. Such a function is aimed at equalizing the charge between the various cells so that all the cells which form the battery pack have the same charge value. In different implementation variants, such an equalization may be implemented by discharging the cells which have a greater charge or charging the cells which have a lower charge with respect to the others. In an implementation example, the equalization function of the cells is performed by respective equalization commands (indicated as a whole with the reference CM4 in FIGS. 1 and 2), actuated by at least one of the supervision modules upon the reception of one or more respective equalization command signals.

It is worth noting that in order to perform the functions illustrated above, each single supervision module 21, 22, 23 must be electrically connected to the respective cells (and/or to temperature and current sensors comprised in such cells) via a plurality of electrical connections.

In this regard, according to an advantageous embodiment of the device 1, each of the supervision modules 21, 22, 23 is electrically connected to the cells of the respective sub-set of cells to be monitored through one or more co-printed circuits, that carry out wiring and electrical connection functions.

The fact that the connection between the supervision module and the respective cells is performed, for example, by a circuit that is co-printed with the supervision module itself makes it possible to simplify and optimize the electrical connections between the device 1 and the battery pack 50, standardizing them, and thus facing one of the most critical aspects of such devices.

According to an embodiment, the device 1 further comprises a battery current sensor 6 either integrated in, or connected to a first supervision module of the plurality of supervision modules 21, 22, 23 and provides the first supervision module with the battery current measurement Ib.

According to different implementation variants, the current sensor may be integrated in the first supervision module or may be an autonomous sensor connected thereto. Furthermore, the current sensor may be a sensor of the "shunt" type or a Hall effect sensor.

So, in at least one of the supervision modules, named "first module" above, there is a supplementary acquisition channel capable of acquiring and treating in an appropriate manner an analogue signal coming from a current sensor so that the device 1 can monitor the battery current Ib.

According to a further embodiment, the device 1 may include a battery voltage sensor 7 either integrated in or connected to a second supervision module of the plurality of supervision modules 21, 22, 23 and that provides the second supervision module with the battery voltage measurement Vb.

It is worth noting that, in such a manner, the device 1 is capable of monitoring the voltage at the battery terminals and of sending a digitized version of it (included in the monitoring signals Sm) to the remote control unit 60. Such an implementation advantageously guarantees the necessary electrical insulation for performing such a measurement.

According to a first implementation example, illustrated in FIG. 1, the first supervision module and the second supervision module coincide, i.e., they are made of the single supervision module, indicated in FIG. 1 by the numeric reference 21.

In accordance with an embodiment of the device 1, one or more modules of the plurality of supervision modules 21, 22, 23 receive one or more respective command signals Sc and to activate one or more respective operation commands CM based on the one or more received command signals Sc.

In such a case, the function of actuating the operation commands necessary for the operation of the battery pack is entrusted to one or more supervision modules controlled by the remote control unit 60.

In an implementation option, a third supervision module 23 of the plurality of supervision modules receives the command signals Sc and activates the respective operation commands CM based on the received command signals Sc.

In such a case, for simplicity of construction, the function of activating the operation commands necessary for the operation of the battery pack is entrusted to only one supervision module controlled by the remote control unit 60.

According to a particular implementation example, the aforesaid first supervision module, second supervision module and third supervision module are formed by a single supervision module.

According to an embodiment, the device 1 activates one or more commands CM belonging to the following set: opening/closure command of one or more main connection relays 51 between battery pack and load (command indicated as CM1 in the figures); activation/deactivation command of a pre-charging circuit 52 (command indicated as CM2 in the figures); activation/deactivation command of battery pack cooling mechanisms 53 (command indicated as CM3 in the figures); one or more equalization commands to equalize the electrical charge between different cells (commands indicated as CM4 in the figures).

The opening/closure command CM1 of one or more relays 51 is for example a relay driving command.

The activation/deactivation command CM2 of a pre-charging circuit 52 is for example a pre-charging circuit driving command.

The activation/deactivation command of battery pack cooling mechanisms 53 may comprise, for example, commands for switching on or off a cooling fan or a pump of a cooling system which is included in the battery pack.

The one or more equalization commands typically operate on each cell to equalize the electrical charge between the different cells. So, in a realization option, the device 1 activates a plurality of equalization commands CM4.

According to a more specific implementation example, such a plurality of equalization commands CM4 comprises an equalization command CM4 for each of the battery cells.

Figure 2:
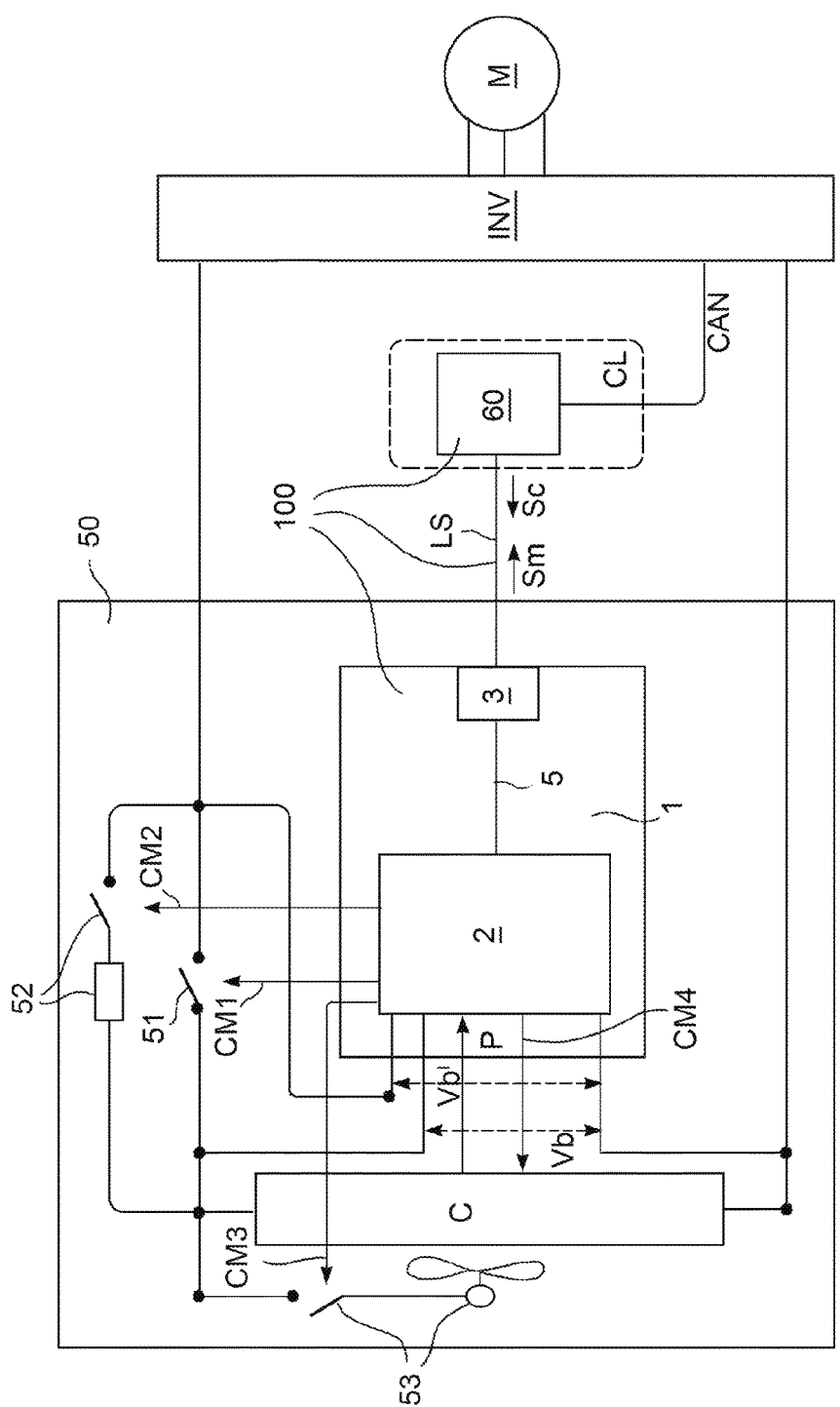
FIG. 2 schematically illustrates an embodiment of a control device and of an apparatus according to the present invention comprising the device in FIG. 1.

It is worth noting that, for simplicity of illustration, in FIG. 2 the one or more equalization commands CM4 are represented by a single line, drawn starting from the device 1 to the set of cells C. It must be understood that this may also comprise the case illustrated above in which the plurality of commands CM4 are sent to the set of cells C, and each of the commands CM4 is directed to a respective cell (C1, Cn).

In different implementation options, the commands which can be actuated by the device 1 (for example, by the non-programmable monitoring and actuation unit 2) may be either one or more than one to any number of commands and may comprise battery pack function commands also of different type with respect to those previously listed by way of example.

It is worth noting that the commands CM illustrated above are used to perform the main control functions envisaged in a battery pack, which in the solutions of the prior art require the presence of a microprocessor unit within the battery pack, while in the device of the present invention they are implemented by the non-programmable monitoring and actuation unit 2.

In an implementation option, the non-programmable monitoring and actuation unit 2 (for example through one of the supervision modules) also detects an actual battery voltage Vb' downstream of the aforesaid main connection relay 51. For example, such an actual battery voltage Vb' is the voltage between a terminal downstream of the main connection relay 51 and the negative battery terminal.

According to an embodiment of the device 1, the two-way serial communication interface 3 is a communication interface of the power-line type that manages power-line communications through one or more electrical energy transfer cables. In such a case, a line or wire already present in the electrical system of the vehicle is advantageously used to support the communication between the non-programmable monitoring and actuation unit 2 and the remote control unit 60, which may be typically arranged in another module or control unit of the vehicle (as will be illustrated in greater detail below).

According to other realization options, the two-way serial communication interface 3 may be of other type, either wired or wireless.

According to a further implementation example, referred to the case in which the battery pack to be controlled is in class B at high voltages (from 60 V to 1.5 kV), the device 1 also measures the insulation resistance between the battery terminals and the ground of the vehicle chassis, e.g., via one of the supervision modules.

Again with reference to FIG. 2, an embodiment is now described of an electronic control system 100 for controlling a battery pack, according to the present invention. The control system 100 comprises an electronic control device 1 according to any one of the embodiments illustrated above.

The system 100 further comprises a remote control unit 60, arranged externally with respect to the battery pack to be controlled. The remote control unit 60 receives and processes monitoring signals Sm that are sent to it by the electronic control device 1, and also generates and sends to the electronic control device 1 at least one command signal Sc. The system 100 further comprises a two-way serial communication line LS connects and puts into communication the control device 1 and the remote control unit 60.

According to an implementation option of the system 100, at least one control signal Sc is generated on the basis of said monitoring signals Sm.
According to a further implementation option of the system 100, the remote control unit 60 comprises a processor included in a control unit CL of the vehicle.

The remote control unit 60 performs the function of remotely controlling the battery pack 50 by generating one or more control signals Sc, on the basis of monitoring signals Sm sent by the control device 1 (integrated in the battery pack 50), and by sending one or more command signals Sc generated by the control device 1, through the serial communication line LS.

According to an embodiment of the system 100, the aforesaid remote control unit (60) is a control unit present in the vehicle and not specifically dedicated to managing the battery pack.

According to various implementation examples, the remote control unit 60 is a control unit of the DC/DC module, and/or a control unit of the inverter/motor assembly of the vehicle and/or another control unit already present in the vehicle such as, for example, an automatic transmission management unit and/or a VMU ("Vehicle Management Unit"), if present, and/or a HMU ("Hybrid Management Unit"), if present.

Advantageously, in such an embodiment, the control and processing functions which in the prior art are performed by a standard BMS, present in the battery pack, are carried out by a control unit (i.e., another processing unit) which is already present for other purposes in the vehicle; while the monitoring and actuation function are performed by the non-programmable monitoring and actuation unit of the control device 1, shown above.

The options that envisage making a remote control unit 60 in a control unit of the DC/DC module, or in a control unit of the inverter/motor assembly of the vehicle have the further advantage of facilitating the communication with the control device 1, included in the battery pack 50, because the aforesaid control units are connected to the same electric energy transmission bus (DC BUS) on which the battery itself is placed and connected. In such a case, the power-line communication may occur on the same electrical energy transmission bus (DC BUS).

According to an implementation example, the remote control unit 60 is implemented by a specific processor included in one of the aforementioned units or control units.

According to another implementation example, the remote control unit 60 is implemented by a processor already provided in one of the aforesaid units or control units, on which there is loaded the software needed to perform the specific battery management functions by the remote control unit 60.

In particular, according to a realization example, the microprocessor on the remote control unit implements all the functions required from the microprocessor of a standard BMS. Since a microprocessor, the power supply blocks, at least one EEPROM and the communication bus driving circuit (bus CAN) are already present on the remote control unit, the components to be added to the remote control unit for implementing the battery remote control unit are: the software for processing the analogue parameters of the battery pack, the command software and drivers, a "calendar chip", i.e., a Real-Time Clock RTC, and the interface towards the serial communication line towards the control device 1.

According to an embodiment of the system, the two-way serial communication line LS is a power-line serial differential line, through one or more cables for direct current electrical energy transfer. Obviously, in such a case, the two-way serial communication interface 3 in the device 1 is a power-line communication interface that manages power-line communications through one or more cables for electrical energy transfer.

In other implementation examples, the two-way serial communication line LS is implemented by other communication technologies, either wired or wireless. According to an implementation option of the system 100, the electronic control device 1 is supplied by the battery pack 50, and is electrically insulated with respect to the remote control unit 60.

Again with reference to FIG. 2, an apparatus according to the invention for supplying electrical energy to a system for moving an electrically-driven or hybrid vehicle is now described.

The apparatus comprises a battery pack 50 adapted to provide a battery voltage Vb and a battery current Ib through a plurality of battery cells C; a control system 100 for controlling a battery pack according to any one of the embodiments illustrated above.

In the apparatus embodiment shown in FIG. 2, the control device 1, in addition to being operatively and electrically connected to the battery pack 50, is also physically connected and integrated in the battery pack 50.

In other embodiments, not shown in the figures, the control device 1 could be arranged differently but always operatively and electrically connected to the battery pack 50.

According to an implementation option, the battery pack 50 is devoid of a local battery management unit and is remotely controlled.

In a realization example, the battery pack 50 supplies voltages either lower than, or equal to 60 VDC. In a particular option, the battery pack 50 supplies a 48 VDC voltage.

In an implementation option, the battery pack 50 comprises electrochemical lithium battery cells.

According to an implementation option, the battery pack 50 is connected to an inverter (INV)-motor (M) assembly of an electrically-driven or hybrid vehicle.

Hereinafter a method is described for controlling a battery pack 50 adapted to provide a battery voltage Vb and a battery current Ib through a plurality of battery cells C. The method comprises the step of detecting analogue battery parameters P, through a non-programmable monitoring and actuation unit 2, electrically and operatively connectable to the battery pack 50 and to each of the battery cells C; the aforesaid analogue battery parameters P comprising at least the magnitudes of battery voltage Vb and battery current Ib.

The method then includes the steps of generating monitoring signals Sm representative of the detected analogue parameters P and of sending the monitoring signals Sm, through a two-way serial communication line LS, to a remote control unit 60 arranged externally to the battery pack 50. The aforesaid step of sending is performed by a control device 1 comprising a non-programmable monitoring and actuation unit 2.

The method then provides the steps of processing the monitoring signals Sm by the remote control unit 60; generating, again by the aforesaid remote control unit 60, at least one command signal Sc representative of at least one respective battery pack operation command CM of the battery pack 50.

Then, the method provides the steps of receiving the aforesaid at least one control signal Sc by the control device 1, through the two-way serial communication line LS; and finally of activating, the aforesaid at least one command CM, by the non-programmable monitoring and actuation unit 2, based on the received command signals Sc.

According to an application example, the method makes it possible to control a battery pack such that it supplies voltages either lower than, or equal to 60 V, for example, 48 V.

According to different method implementation options, the method is implemented by an electronic device 1 according to any one the embodiments of the device described above.

According to a realization option of the method, at least one of the at least one command signals Sc is generated by the remote control unit 60 based on aforesaid monitoring signals Sm.

According to an implementation example of the method, the aforesaid analogue battery parameters P further comprise temperature Tc1, Tcn, and/or current Ic1, Icn and/or voltage Vc1, Vcn of each battery cell C.

According to a method implementation option, the aforesaid remote control unit 60 is a control unit present in the vehicle and not specifically dedicated to managing the battery pack.

As can be observed, the object of the present invention is fully achieved by the device 1 by virtue of the functional and structural features thereof.

In fact, the control device 1 is less complex and makes it possible to reduce costs with respect to the currently known battery control systems (BMS) because it implements all the necessary functions without requiring the presence of a computer with microprocessor. On the other hand, such a control device 1 provides all the monitoring, supervision and actuation functions needed for the correct operation of the battery pack. Such functions are indeed implemented, as illustrated above, by a non-programmable monitoring and actuation unit (thus simpler than a microprocessor unit) and in all cases is improved so as to be able to perform monitoring and also supervision and command actuation functions under the control of a remote control unit comprising a microprocessor. The connection between the control device and the remote control unit is guaranteed by a two-way serial communication interface comprised in the device itself.

In the case in which such an interface is connectable to a serial communication line of the power-line type, a further advantage is obtained of exploiting infrastructures which are already present in the electronic control system of the vehicle (e.g., cables for electrical energy transmission) to support the communication between control device and remote management unit.

It is worth noting that the possibility offered by the solution described above of equipping the battery with a control device which is fully functional but devoid of a processing unit with microprocessor implies, more in general, that the need to develop and to fit a specific and autonomous control unit, dedicated only to for the battery back, is no longer necessary. In turn, this implies a considerable simplification of the hardware part and of the firmware and software parts of the battery pack control.

The advantages indicated above are particularly relevant for "class A" battery packs, but are also obtained in case of "class B" battery packs.

Furthermore, if the control device 1 comprises supervision modules electrically connected to the battery cells by one or more co-printed circuits, implement wiring and electrical connection functions, further important advantages are obtained in terms of optimization and reduction of the wiring costs. Such further advantages are particularly relevant for "class B" battery packs, which comprise a high number of battery cells to be supervised.

Considering now the solution of the invention on a system level, it is worth noting that the choice of remotely controlling a control unit, having processing capacities based on a microprocessor, in a remote control unit with respect to the battery pack is the result of a non-obvious insight of the Applicant, and overturns the approach unanimously deemed necessary until today concerning the need to equip a control unit and a BMS with microprocessor within the battery pack itself.

The system of the invention, by virtue of the features of the control device 1 and of the communication provided between such a device and the remote control unit, makes it possible to drastically simplify the control device to be integrated in the battery pack without damaging performance and functionalities required by the battery pack control in any manner.

In fact, the solution described here makes it possible to make the battery packs without needing a BMS associated to the battery pack itself.

On the other hand, the presence of control units in the vehicle, adapted to implement the functions of remote control unit simply by loading further software programs (e.g., application software which implements the BMS functions in the host control unit) and minimum hardware and firmware variations makes the increase of complexity of the vehicle systems outside the battery pack nearly negligible.

Furthermore, the fact that the entire electronic control system of the vehicle requires one control system less (in fact, the control unit is not present in the battery pack) simplifies the communications and the control of such a control system as a whole.

Similar advantages may be identified with reference to the methods using the device and the control system according to the invention.

Those skilled in the art may make changes and adaptations to the embodiments of the device, the system and apparatus described above or can replace elements with others which are functionally equivalent to satisfy contingent needs without departing from the scope of protection of the appended claims.

All the features described above as belonging to one possible embodiment may be implemented independently from the other described embodiments. It is further worth noting that the word "comprising" does not exclude other elements or steps and that the article "a" does not exclude a plurality. The figures are not in scale because they privilege the requirement of appropriately highlighting the various parts for greater clarity of illustration.

The invention claimed is:

1. An electronic control device for controlling a vehicle battery pack, wherein the battery pack is adapted to provide a battery voltage and a battery current through a plurality of battery cells, and wherein the electronic control device is configured to connect to the vehicle battery pack and adapted to interact with a remote control unit external to the battery pack, and the electronic control device is remote from the remote control unit,
    wherein the electronic control device comprises:
    a non-programmable monitoring and actuation unit, configured to electrically and operatively connect to the battery pack and to each of the battery cells to detect analogue battery parameters, comprising at least the magnitudes of battery voltage and battery current, the non-programmable monitoring and actuation unit generates monitoring signals representative of the detected analogue battery parameters, to receive at least one command signal representative of at least one respective operation command of the battery pack, and activates said at least one command;
    a two-way serial communication interface, connected to the non-programmable monitoring and actuation unit to receive said monitoring signals and to provide said at least one command signal, and configured to connect to an external two-way serial communication line so as to put in direct connection the non-programmable monitoring and actuation unit with the remote control unit, the two-way serial communication interface being further configured to send the monitoring signals from the non-programmable monitoring and actuation unit to the remote control unit, to be processed by the remote control unit, and to receive, by the non-programmable monitoring and actuation unit, the at least one command signal from the remote control unit, through said two-way serial communication line.

2. The electronic control device as set forth in claim 1, wherein said analogue battery parameters further include temperature, current and voltage of each battery cell.

3. The electronic control device as set forth in claim 1, further including a supply input configured to connect to the battery pack, so that the electronic control device is supplied by the battery pack and is electrically insulated with respect to the remote control unit.

4. The electronic control device as set forth in claim 1, wherein the non-programmable monitoring and actuation unit includes a plurality of supervision modules, wherein each of the supervision modules detects temperature, current and voltage of a respective battery cell or of each cell of a respective sub-set of battery cells, and generates the respective monitoring signals,
    and wherein the electronic control device further includes an internal two-way communication line, connected to each of the supervision modules and also connected to the two-way serial communication interface, the internal two-way communication line collects and transmits the analogue parameters detected by the supervision modules to the two-way serial communication interface, and transmits the at least one command signal to at least one of the supervision modules.

5. The electronic control device as set forth in claim 4, further including:
    a battery current sensor integrated in or connected to a first supervision module of the plurality of supervision modules and that provides said first supervision module with the battery current measurement;
    a battery voltage sensor integrated in or connected to a second supervision module of the plurality of supervision modules and that provides said second supervision module with the battery voltage measurement.

6. The electronic control device as set forth in claim 4, wherein one or more modules of the plurality of supervision modules receives one or more respective command signals and activates one or more respective operation commands based on the one or more command signals received,
    or wherein a third supervision module of the plurality of supervision modules receives the command signals and activates one or more respective operation commands based on the one or more command signals received.

7. The electronic control device as set forth in claim 4, wherein each of the supervision modules is electrically connected to the cells of the respective sub-set of cells to be monitored through one or more co-printed circuits, so as to carry out wiring and electrical connection functions.

8. The electronic control device as set forth in claim 1, wherein the monitoring and actuation unit activates one or more commands belonging to the following set of commands:
    opening/closure command of one or more main connection relays between battery pack and load;
    activation/deactivation command of a pre-charging circuit;
    activation/deactivation command of battery pack cooling mechanisms;
    one or more equalization commands to equalize the electrical charge between different battery cells,
    and wherein the non-programmable monitoring and actuation unit detects an actual battery voltage downstream of said main connection relay.

9. A control system for controlling a vehicle battery pack, comprising:
    an electronic control device for controlling a vehicle battery pack, wherein the battery pack is adapted to provide a battery voltage and a battery current through a plurality of battery cells, and wherein the electronic control device is connected to the vehicle battery pack and adapted to interact with a remote control unit external to the battery pack, and the electronic control device is remote from the remote control unit,
wherein the electronic control device comprises:
a non-programmable monitoring and actuation unit, electrically and operatively connected to the battery pack and to each of the battery cells to detect analogue battery parameters, comprising at least the magnitudes of battery voltage and battery current, the non-programmable monitoring and actuation unit generates monitoring signals representative of the detected analogue battery parameters, to receive at least one command signal representative of at least one respective operation command of the battery pack, and activates said at least one command;
a two-way serial communication interface, connected to the non-programmable monitoring and actuation unit to receive said monitoring signals and to provide said at least one command signal, and configured to connect to an external two-way serial communication line so as to put in direct connection the non-programmable monitoring and actuation unit with the remote control unit,
the two-way serial communication interface being further configured to send the monitoring signals from the non-programmable monitoring and actuation unit to the remote control unit, to be processed by the remote control unit, and to receive, by the non-programmable monitoring and actuation unit, the at least one command signal from the remote control unit, through said two-way serial communication line;
a remote control unit, arranged externally with respect to the battery pack to be controlled, so as to receive and process monitoring signals that are sent by the electronic control device, and generates and sends to the electronic control device at least one command signal; and
a two-way serial communication line that connects and puts in communication the control device and the remote control unit.

10. The control system as set forth in claim 9, wherein said remote control unit is a control unit present in the vehicle and not specifically dedicated to managing the battery pack.

11. The control system as set forth in claim 10, wherein said remote control unit is a control unit of the DC/DC module, and/or a control unit of the vehicle inverter/motor assembly, and/or an automatic transmission management unit, and/or a Vehicle Management Unit, and/or a Hybrid Control Unit.

12. The control system as set forth in claim 9, wherein:
the two-way serial communication interface is a power-line communication interface that manages power-line communications through one or more electrical energy transfer cables;
the two-way serial communication line is a power-line serial differential line, through one or more cables for direct current electrical energy transfer.

13. An apparatus for supplying electrical energy to a system for moving an electrically-driven or hybrid vehicle, the apparatus comprising:
a battery pack adapted to provide a battery voltage and a battery current through a plurality of battery cells;
a control system for controlling a battery pack as set forth in claim 9.

14. The apparatus as set forth in claim 13, wherein the battery pack is devoid of a local battery management unit, and is remotely controlled.

15. The apparatus as set forth in claim 13, wherein the battery pack delivers voltages less than or equal to 60 VDC, and wherein the battery pack includes electrochemical lithium battery cells, and wherein the battery pack is connected to an inverter-motor assembly of an electrically-driven or hybrid vehicle.

16. A method for controlling a vehicle battery pack, adapted to provide a battery voltage and a battery current through a plurality of battery cells, comprising the steps of:
detecting analogue battery parameters, through a non-programmable monitoring and actuation unit, electrically and operatively connected to the battery pack and to each of the battery cells, said analogue battery parameters comprising at least the magnitudes of battery voltage and battery current;
generating monitoring signals representative of the analogue parameters detected;
sending, by an electronic control device connected to the battery pack and to each of the battery cells and comprising said non-programmable monitoring and actuation unit, the generated monitoring signals to a remote control unit, arranged externally with respect to the battery pack and remotely with respect to the electronic control device, through a two-way serial communication line which directly connects said electronic control device and said remote control unit;
processing the monitoring signals by said remote control unit;
generating, by said remote control unit, at least one command signal representative of at least one respective battery pack operation command;
receiving, by the electronic control device, through said two-way serial communication line, said at least one control signal, generated by the remote control unit;
activating said at least one command, by said non-programmable monitoring and actuation unit, based on the at least one command signal received.

17. The method as set forth in claim 16, wherein at least one of the at least one command signals is generated by the remote control unit based on said monitoring signals.

18. The method as set forth in claim 16, wherein said remote control unit is a control unit present in the vehicle and not specifically dedicated to manage the battery pack.

* * * * *